United States Patent
Kusano et al.

(10) Patent No.: US 11,977,583 B2
(45) Date of Patent: May 7, 2024

(54) DATA LINKAGE SYSTEM, LEARNING DEVICE, AND ESTIMATION DEVICE

(71) Applicant: NEC Corporation, Tokyo (JP)

(72) Inventors: Genki Kusano, Tokyo (JP); Masafumi Oyamada, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 18/007,786

(22) PCT Filed: Jun. 5, 2020

(86) PCT No.: PCT/JP2020/022371
§ 371 (c)(1),
(2) Date: Dec. 2, 2022

(87) PCT Pub. No.: WO2021/245927
PCT Pub. Date: Dec. 9, 2021

(65) Prior Publication Data
US 2023/0229709 A1    Jul. 20, 2023

(51) Int. Cl.
*G06F 16/9035* (2019.01)
*G06F 16/906* (2019.01)

(52) U.S. Cl.
CPC ........ *G06F 16/9035* (2019.01); *G06F 16/906* (2019.01)

(58) Field of Classification Search
CPC .............................. G06F 16/9035; G06F 16/906
See application file for complete search history.

(56) References Cited

U.S. PATENT DOCUMENTS

2020/0233865 A1*  7/2020  Myers ................ G06F 16/9035

FOREIGN PATENT DOCUMENTS

| | | |
|---|---|---|
| JP | 2015-106178 A | 6/2015 |
| JP | 2018-181326 A | 11/2018 |
| JP | 2019-109556 A | 7/2019 |
| JP | 2020-060931 A | 4/2020 |
| WO | 2019/202857 A1 | 10/2019 |

OTHER PUBLICATIONS

International Search Report for PCT Application No. PCT/JP2020/022371, dated Aug. 25, 2020.
Iofciu T. Fankhauser P, Abel F, Bischoff K, "Identifying users across social tagging systems", Proceedings of the fifth international conference on weblogs and social media, 2011.

(Continued)

*Primary Examiner* — Baoquoc N To

(57) ABSTRACT

The data linkage system 90 includes a learning device 70 which generates a score function, which is a function that scores proximity between a user with an action history in a first domain and a user with an action history in a second domain, and an estimation device 80 which estimates a user matched in the first domain and the second domain. The score calculation means 82 calculates a score for a pair of users who have an action history in a first domain and an action history in a second domain using a score function. The matching means 83 estimates the same user as the user in the first domain from among the users in the second domain based on magnitude of the calculated score.

8 Claims, 8 Drawing Sheets

(56) References Cited

OTHER PUBLICATIONS

Feng. J. Zhang. M, Wang. H, Yang. Z, Zhang. C, Li. Y, Jin .D. "DPLink: User identity linkage via deep neural network from heterogeneous mobility data", WWW 2019, pp. 459-469.

Narayanan. A, Shmatikov. V, "Robust De-anonymization of large sparse datasets", In 2008 IEEE symposium on security andprivacy (S&P 2008), pp. 111-125, 2008.

D. Gale and L. S. Shapley, "College Admissions and the Stability of Marriage," The American Mathematical Monthly, vol. 69, No. 1, pp. 9-15, 1962.

* cited by examiner

DATA LINKAGE SYSTEM, LEARNING DEVICE, AND ESTIMATION DEVICE

This application is a National Stage Entry of PCT/JP2020/022371 filed on Jun. 5, 2020, the contents of all of which are incorporated herein by reference, in their entirety.

TECHNICAL FIELD

This invention relates to a data linkage system, a learning device, an estimation device, a data linkage method, a score function generating method, an estimation method, a learning program, and an estimation program for linking data between different domains associated with users.

BACKGROUND ART

Customer data held by each company is usually assigned a different customer ID (Identification). In addition, from the viewpoint of privacy protection, personal information such as names cannot be disclosed. For this reason, various methods have been proposed to link the data of the same user across different domains (hereinafter referred to as ID-synchronization). For example, a method using cookies has been put into practical use as a method of ID-synchronization between a web advertisement and a mail order site.

Other methods for identifying users throughout the social tag system are described in Non Patent Literature 1. Specifically, the method described in Non Patent Literature 1, ID-synchronization is performed based on tags given by users of the two SNSs (social networking services) when they post information.

Non Patent Literature 2 also describes a method for linking user IDs of different types of mobility data using deep neural networks. Specifically, the method described in Non Patent Literature 2 performs ID-synchronization based on location information posted on two SNSs.

Non Patent Literature 3 describes De-anonymization. Specifically, Non Patent Literature 3 describes that a user can be identified by comparing anonymized experimental data with public database information of movie ratings.

In addition, Patent Literature 1 describes a method of personal identification using an action history. The method described in Patent Literature 1 uses GPS (Global Positioning System) information of a mobile terminal as behavior information to identify an individual, and calculates the identity probability based on past and current behavior. In addition, Patent Literature 2 describes a method for reducing or preventing unauthorized resale of electronic tickets.

Non Patent Literature 4 describes the Gale-Shapley algorithm used for stable matching.

CITATION LIST

Patent Literature

PTL 1: Japanese Patent Application Laid-Open No. 2019-109556
PTL 2: WO 2019/202857

Non Patent Literature

NPL 1: Iofciu T, Fankhauser P, Abel F, Bischoff K, "Identifying users across social tagging systems", Proceedings of the fifth international conference on weblogs and social media, 2011.

NPL 2: Feng. J, Zhang. M, Wang. H, Yang. Z, Zhang. C, Li. Y, Jin.D, "DPLink: User identity linkage via deep neural network from heterogeneous mobility data", WWW 2019, pp. 459-469.

NPL 3: Narayanan. A, Shmatikov. V, "Robust De-anonymization of large sparse datasets", In 2008 IEEE symposium on security andprivacy (S&P 2008), pp. 111-125, 2008.

NPL 4: D. Gale and L. S. Shapley, "College Admissions and the Stability of Marriage," The American Mathematical Monthly, Vol. 69, No. 1, pp. 9-15, 1962.

SUMMARY OF INVENTION

Technical Problem

On the other hand, there are cases where ID-synchronization using cookies is not possible due to regulatory efforts to restrict the use of cookies. In addition, since data from physical stores is used offline, cookies do not exist in the first place.

In addition, the methods described in each of the above-mentioned Patent Literatures and Non Patent Literatures have restrictions on the nature of the two datasets to be linked. For example, the methods described in each of the Non Patent Literatures assume a situation where the two datasets to be linked are composed of data from the same domain (i.e., have commonality in behavior). For example, in two SNSs, ID-synchronization is performed using the location tagged by the user in one SNS and the location tagged in the other SNS.

Furthermore, in the methods described in each of Non Patent Literatures mentioned above, as a characteristic of the two data sets to be linked, it is assumed that the data sets consist of data in which the same user performed similar actions. For example, a situation in which a user makes a post in one SNS at a certain location and then makes a post in the other SNS at a location close to the above location at the same time can be assumed.

For example, consider the situation of measuring the effectiveness of advertising in a supermarket. In this case, the advertising company has a history of advertising. On the other hand, the supermarket has a history of product sales. In other words, the advertising company and the supermarket each have different domain data sets. Furthermore, the supermarket does not have a history of advertising, and conversely, the advertising company does not have a history of product sales. Therefore, in order to measure the effectiveness of advertising, it is necessary to make ID-synchronization for these two different domain data sets.

However, in such a situation, even if the advertisement and the product are identical, a user who refers to an advertisement will not necessarily purchase the product advertised in that advertisement. Thus, even the same user is expected to perform different actions. Therefore, it is desirable to be able to appropriately identify the same user and link data even between different domains.

Therefore, it is an exemplary object of the present invention to provide a data linkage system, a learning device, an estimation device, a data linkage method, a score function generating method, an estimation method, a learning program, and an estimation program that can link data between different domains associated with users.

Solution to Problem

The data linkage system according to the present invention includes: a learning device which generates a score function, which is a function that scores proximity between a user with an action history in a first domain and a user with an action history in a second domain; and an estimation device which estimates a user matched in the first domain and the second domain, wherein the learning device includes: an action history input means which accepts input of the action history of the first domain in the user identified as being by a same user between the first domain and the second domain, and input of the action history of the second domain; an action history combining means which generates a set of combined data that combines the user's action history in the first domain with the user's action history in the second domain; a converter generating means which generates a converter that converts an action history into a vector by learning using the set of combined data; a conversion means which converts the action history of the first domain into a first domain vector and the action history of the second domain into a second domain vector using the generated converter; a similarity function generating means which generates a similarity function for deriving similarity between the first domain vector and the second domain vector; and a score function definition means which defines the score function using the generated similarity function, and wherein the estimation device includes: a user set input means which accepts input of the user's action history in the first domain not identified as being by a same user between the first domain and the second domain, and input of the user's action history of the second domain; a score calculation means which calculates a score for an accepted pair of a user having the action history in the first domain and a user having the action history in the second domain, by using the score function; and a matching means which estimates a same user as the user in the first domain from among the users in the second domain based on magnitude of the calculated score.

The learning device according to the present invention includes: an action history input means which accepts input of an action history of a first domain in a user identified as being by a same user between the first domain and a second domain, and input of an action history of the second domain; an action history combining means which generates a set of combined data that combines the user's action history in the first domain with the user's action history in the second domain; a converter generating means which generates a converter that converts an action history into a vector by learning using the set of combined data; a conversion means which converts the action history of the first domain into a first domain vector and the action history of the second domain into a second domain vector using the generated converter; a similarity function generating means which generates a similarity function for deriving similarity between the first domain vector and the second domain vector; and a score function definition means which defines a score function, which is a function that scores proximity between a user with an action history in the first domain and a user with an action history in the second domain, by using the generated similarity function.

The estimation device according to the present invention includes: a user set input means which accepts input of a user's action history in a first domain not identified as being by a same user between the first domain and a second domain, and input of a user's action history of the second domain; a score calculation means which calculates a score for an accepted pair of a user having the action history in the first domain and a user having the action history in the second domain, by using a score function which is a function that scores proximity between a user with an action history in the first domain and a user with an action history in the second domain; and a matching means which estimates a same user as the user in the first domain from among the users in the second domain based on magnitude of the calculated score, wherein, the score function is generated by a learning device, and the learning device comprising: an action history input means which accepts input of the action history of the first domain in the user identified as being by the same user between the first domain and the second domain, and input of the action history of the second domain; an action history combining means which generates a set of combined data that combines the user's action history in the first domain with the user's action history in the second domain; a converter generating means which generates a converter that converts an action history into a vector by learning using the set of combined data; a conversion means which converts the action history of the first domain into a first domain vector and the action history of the second domain into a second domain vector using the generated converter; a similarity function generating means which generates a similarity function for deriving similarity between the first domain vector and the second domain vector; and a score function definition means which defines the score function using the generated similarity function.

The data linkage method according to the present invention includes: data linkage method comprising: accepting input of an action history of a first domain in a user identified as being by a same user between the first domain and a second domain, and input of an action history of the second domain; generating a set of combined data that combines the user's action history in the first domain with the user's action history in the second domain; generating a converter that converts an action history into a vector by learning using the set of combined data; converting the action history of the first domain into a first domain vector and the action history of the second domain into a second domain vector using the generated converter; generating a similarity function for deriving similarity between the first domain vector and the second domain vector; defining a score function, which is a function that scores the proximity between a user with an action history in the first domain and a user with an action history in the second domain, by using the generated similarity function; accepting input of the user's action history in the first domain not identified as being by the same user between the first domain and the second domain, and input of the user's action history of the second domain; calculating a score for an accepted pair of a user having the action history in the first domain and a user having the action history in the second domain, by using the score function; and estimating a same user as the user in the first domain from among the users in the second domain based on magnitude of the calculated score.

The score function generating method according to the present invention includes: accepting input of an action history of a first domain in a user identified as being by a same user between the first domain and a second domain, and input of an action history of the second domain; generating a set of combined data that combines the user's action history in the first domain with the user's action history in the second domain; generating a converter that converts an action history into a vector by learning using the set of combined data; converting the action history of the first domain into a first domain vector and the action history of the second domain into a second domain vector using the generated converter; generating a similarity function for deriving similarity between the first domain vector and the second domain vector; and defining a score function, which is a function that scores the proximity between a user with an action history in the first domain and a user with an action history in the second domain, by using the generated similarity function.

The estimation method according to the present invention includes: accepting input of a user's action history in a first domain not identified as being by a same user between the first domain and a second domain, and input of a user's action history of the second domain; calculating a score for an accepted pair of a user having the action history in the first domain and a user having the action history in the second domain, by using a score function which is a function that scores the proximity between a user with an action history in a first domain and a user with an action history in a second domain; and estimating a same user as the user in the first domain from among the users in the second domain based on magnitude of the calculated score, wherein, the score function is generated by a learning device, and the learning device comprising: an action history input means which accepts input of the action history of the first domain in the user identified as being by the same user between the first domain and the second domain, and input of the action history of the second domain; an action history combining means which generates a set of combined data that combines the user's action history in the first domain with the user's action history in the second domain; a converter generating means which generates a converter that converts an action history into a vector by learning using the set of combined data; a conversion means which converts the action history of the first domain into a first domain vector and the action history of the second domain into a second domain vector using the generated converter; a similarity function generating means which generates a similarity function for deriving similarity between the first domain vector and the second domain vector; and a score function definition means which defines the score function using the generated similarity function.

The learning program according to the present invention causing a computer to execute: action history input process of accepting input of an action history of a first domain in a user identified as being by a same user between the first domain and a second domain, and input of an action history of the second domain; action history combining process of generating a set of combined data that combines the user's action history in the first domain with the user's action history in the second domain; a converter generating process of generating a converter that converts an action history into a vector by learning using the set of combined data; a conversion process of converting the action history of the first domain into a first domain vector and the action history of the second domain into a second domain vector using the generated converter; a similarity function generating process of generating a similarity function for deriving similarity between the first domain vector and the second domain vector; and a score function definition process of defining a score function, which is a function that scores the proximity between a user with an action history in the first domain and a user with an action history in the second domain, by using the generated similarity function.

The estimation program according to the present invention causing a computer to execute: user set input process of accepting input of a user's action history in a first domain not identified as being by a same user between the first domain and a second domain, and input of a user's action history of the second domain; score calculation process of calculating a score for an accepted pair of a user having the action history in the first domain and a user having the action history in the second domain, by using a score function which is a function that scores the proximity between a user with an action history in a first domain and a user with an action history in a second domain; and a matching process of estimating a same user as the user in the first domain from among the users in the second domain based on magnitude of the calculated score, wherein, the score function is generated by a second computer, and the second computer comprising: an action history input means which accepts input of the action history of the first domain in the user identified as being by the same user between the first domain and the second domain, and input of the action history of the second domain; an action history combining means which generates a set of combined data that combines the user's action history in the first domain with the user's action history in the second domain; a converter generating means which generates a converter that converts an action history into a vector by learning using the set of combined data; a conversion means which converts the action history of the first domain into a first domain vector and the action history of the second domain into a second domain vector using the generated converter; a similarity function generating means which generates a similarity function for deriving similarity between the first domain vector and the second domain vector; and a score function definition means which defines the score function using the generated similarity function.

Advantageous Effects of Invention

According to the invention, data between different domains associated with a user can be linked.

DESCRIPTION OF EMBODIMENTS

The following is a description of the exemplary embodiment of the invention with reference to the drawings.

Figure 1:
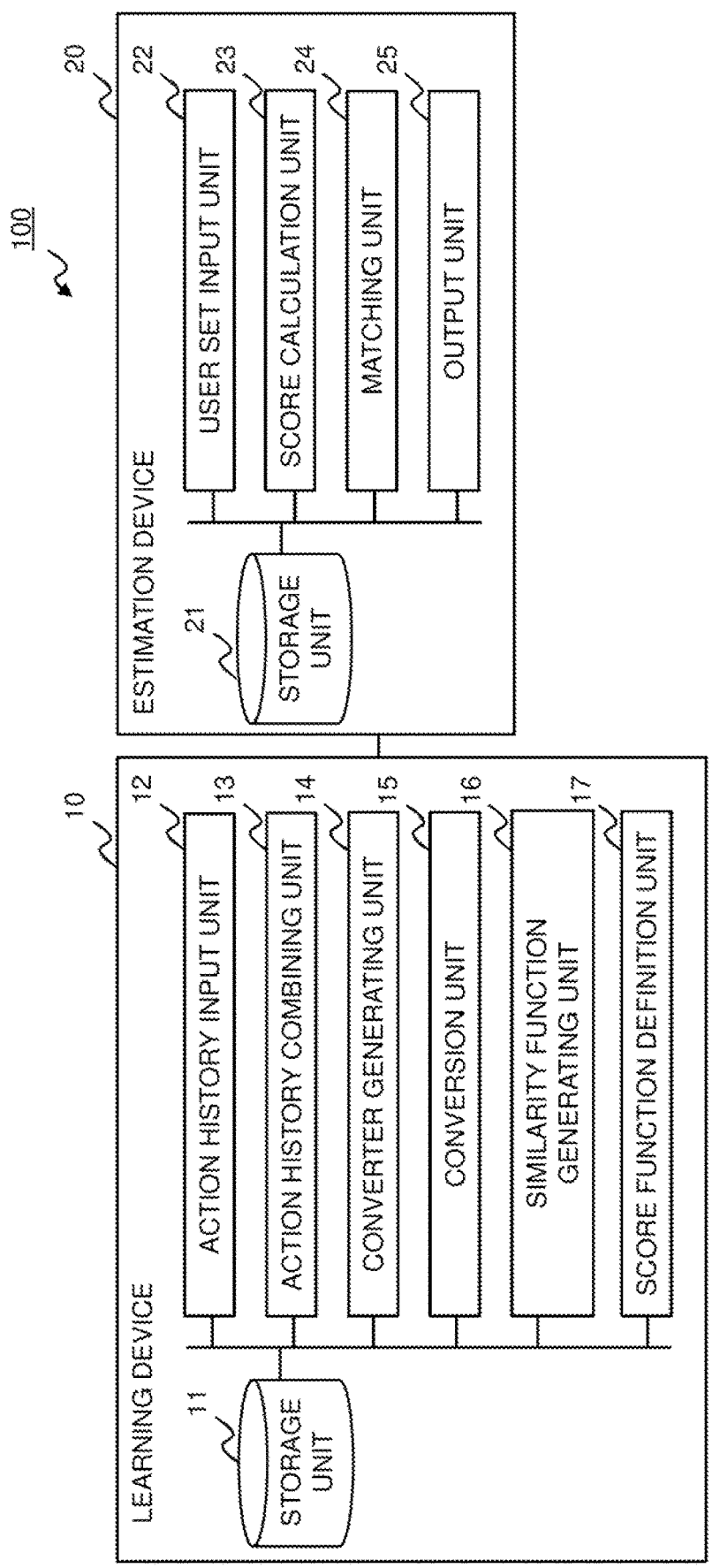
FIG. 1 It depicts a block diagram showing a configuration example of an exemplary embodiment of the data linkage system according to the present invention.

FIG. 1 is a block diagram showing a configuration example of an exemplary embodiment of the data linkage system according to the present invention. This exemplary embodiment of the data linkage system is a system that identifies the same user from the data sets of two domains associated with the user. In the following description, the process of identifying the same user between domains, as described above, is sometimes referred to as ID-synchronization.

In particular, this exemplary embodiment will focus on ID-synchronization in two different domains. Specifically, assuming a situation where the effectiveness of advertising (impact on purchasing) is measured, the example of advertising history by an advertising company to a user is given as a first domain, and the example of a user's purchasing history in a supermarket is given as a second domain. However, the following examples are not intended to exclude ID-synchronization of similar domains using the data linkage system 100 in this exemplary embodiment, and it is possible to use a data set of two domains with arbitrary characteristics.

In this exemplary embodiment, the data associated with a user is the action history in each domain. The action history is represented by a set of pairs of action results related to a single user and date and time when the action was performed. For example, the action history in the first domain is the history of the action results that the advertising company advertised to the user, and the action history in the second domain is the history of the action results that the user purchased products at a supermarket.

In the following, the action results in each domain are sometimes referred to as items. In other words, the action history can be said to be a time series of items. If the item is $a_i$ and the time is $t_i$, the user's action history u is represented as $u=\{(a_1, t_1), \ldots, (a_n, t_n)\}$.

The data linkage system 100 in this exemplary embodiment includes a learning device 10 and an estimation device 20.

The learning device 10 is a device that generates a function (hereinafter referred to as the score function) that scores the proximity between a user with an action history in the first domain and a user with an action history in the second domain. The learning device 10 includes a storage unit 11, an action history input unit 12, an action history combining unit 13, a converter generating unit 14, a conversion unit 15, a similarity function generating unit 16, and a score function definition unit 17.

The storage unit 11 stores various information used by the learning device 10 for processing. Specifically, the storage unit 11 may store the user's action history in the two domains. If the user's action history in the two domains is stored in a storage (not shown) connected via a communication line, the storage unit 11 may not store this action history. The storage unit 11 is realized by, for example, a magnetic disk.

Figure 2:
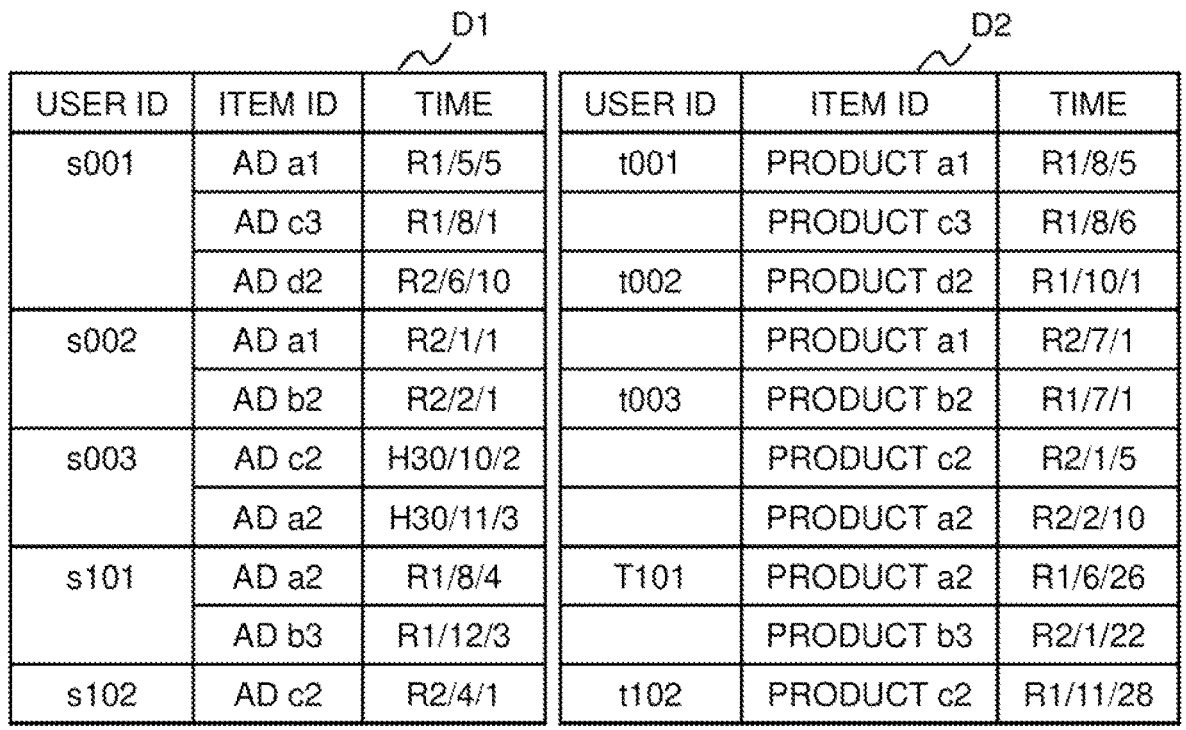
FIG. 2 It depicts an explanatory diagram showing an example of a user's action history.

FIG. 2 is an explanatory diagram showing an example of the user's action history. The example shown in FIG. 2 represents that the action history D1 of a user in the first domain s includes users s001, s002, s003, s101 and s102, and the action history D2 of a user in the second domain t includes the action histories of users t001, t002, t003, t101 and t102.

In the example shown in FIG. 2, the action history of user s001 represents that the user saw the advertisement a1 at R1/5/5 (May 5, 2019), saw the advertisement c3 at R1/8/1 (Aug. 1, 2019), and saw the advertisement d2 at R2/6/10 (Jun. 10, 2020). Similarly, the action history of user t002 represents that the user purchased product z2 at R1/10/1 (Oct. 1, 2019), and purchased product x3 at R2/7/1 (Jul. 1, 2020). The same is true for the other action histories.

The action history input unit 12 accepts input of the user's action history in the two domains (specifically, the user's action history in the first domain and the user's action history in the second domain). The set of accepted user's action histories in each domain is sometimes referred to as a data set. In this exemplary embodiment, the action history input unit 12 accepts input of the action history of the first domain in the user identified as being by a same user between the first domain and the second domain.

In the following, the set of users who are identified as the same user's action history across each domain is sometimes referred to as the set of users $P^{train}$ whose ID-synchronization is known. In the example shown in FIG. 2, s001 to s003 and t001 to t003 are the users whose ID-synchronization is known, respectively. Specifically, it is assumed that user s001 in the first domain and user t002 in the second domain are the same user A, and that user s002 in the first domain and user t003 in the second domain are the same user B. In this case, $P^{train}=\{$user A $(=s001=t002)$, user B $(=s002=t003)\}$.

In the example shown in FIG. 2, the action history input unit 12 accepts inputs of the action histories (the action histories of users s001 to s003) of the first domain of a user for whom ID-synchronization is known, and the action histories (the action histories of users t001 to t003) of the second domain.

In the following, the action history of an individual user in the first domain accepted by the action history input unit 12 is denoted by $u_i^s$, and the set of such action histories is denoted by $D^{s,\,train}$. Similarly, the action history of an individual user in the second domain accepted by the action history input unit 12 is denoted by $u_j^t$, and the set of such action histories is denoted by $D^{t,\,train}$. In other words, $$\mathcal{D}^{s,train}:=\{u_i^s \in \mathcal{D}^s | i \in \mathcal{P}^{train}\}, \mathcal{D}^{t,train}:=\{u_j^t \in \mathcal{D}^t | j \in \mathcal{P}^{train}\}. \quad \text{[Math. 1]}$$

The action history combining unit 13 generates a set of data that combines the user's action history in the first domain for which input is accepted with the user's action history in the second domain (hereinafter referred to as the combined data). By combining the action histories in each domain, it is possible to represent the co-occurrence relationship of items in different domains (two data sets). Let the set of combined data be $D^{fusion,\,train}$, then $$\mathcal{D}^{fusion,train} \leftarrow (\mathcal{D}^{s,train}, \mathcal{D}^{t,train}). \quad \text{[Math. 2]}$$

The method by which the action history combining unit 13 combines the user's action histories is arbitrary. For example, the action history combining unit 13 may generate a union set of the action histories of two domains of the same user as the combined data so that the action history across both data sets can be captured. In other words, $$\mathcal{D}^{fusion,train}:=\{u_p^s \cup u_p^t | p \in \mathcal{P}^{train}\}. \quad \text{[Math. 3]}$$

Alternatively, the action history combining unit 13 may simply generate a union set of data sets as the combined data so that the action histories for each domain can be handled collectively. In other words, $$\mathcal{D}^{fusion,train}:=\mathcal{D}^{s,train} \cup \mathcal{D}^{t,train}. \quad \text{[Math. 4]}$$

Furthermore, the action history combining unit 13 may generate a union set of the above data sets as combined data so that these effects can be obtained simultaneously. In other words, $$\mathcal{D}^{fusion,train}:=\{u_p^s \cup u_p^t | p \in \mathcal{P}^{train}\} \cup \mathcal{D}^{s,train} \cup \mathcal{D}^{t,train} \quad \text{[Math. 5]}$$

In other words, the action history combining unit 13 may generate a set of combined data by combining only the action histories of the same user, or may generate a set of combined data by combining the action histories of the same or different users in the user set for which ID-synchronization is known, respectively. In either method, it is possible to represent items from different domains as a single set of combined data.

For example, if $P^{train}=\{(user) A, (user) B\}$, then the action history combining unit 13 may generate $D^{fusion,\ train}=\{(u_A{}^s, u_A{}^t), (u_B{}^s, u_B{}^t)\}$, and generate $D^{fusion,\ train}=\{u_A{}^s, u_A{}^t), (u_A{}^s, u_B{}^t), (u_B{}^s, u_A{}^t), (u_B{}^s, u_B{}^t)\}$, as a set of combined data. By generating a set of combined data that combines the action histories of different users, it is possible to increase the amount of data used by the converter generating unit 14 for learning, as described below.

The converter generating unit 14 learns a correspondence v that converts the action history into a vector using the set of combined data generated by the action history combining unit 13. In other words, for an action history u, v(u) is its vector. Specifically, the converter generating unit 14 uses the set of combined data generated by the action history combining unit 13 to generate a converter v (vector converter) that converts the action history into a vector.

Here, the inventor came up with the idea that by considering an item as a word, the action history can be treated as a sentence. In other words, by considering items as words, it is possible to treat the action history as sentences. Therefore, the converter generating unit 14 rearranges the items in the action history in chronological order, regards the items as words, and converts the action history into sentences. Then, the converter generating unit 14 generates a converter that converts the user's potential action history into a numerical vector that is easy to analyze.

The method by which the converter generating unit 14 generates a converter that converts the action history (specifically, the documented action history) into a vector is arbitrary. The converter generating unit 14 can, for example, use Doc2Vec or BM25, TF-IDF (Term Frequency-Inverse Document Frequency), Bag-of-Words, LDA (Latent Dirichlet Allocation), average of Word2vec, etc., may be used to generate a converter.

The conversion unit 15 converts the action history of each domain into a vector using the converter generated by the converter generating unit 14. Hereafter, the vector converted from the action history of the first domain is denoted as the first domain vector vis and the vector converted from the action history of the second domain is denoted as the second domain vector vat. In other words, the conversion unit 15 converts the action history of the first domain into the first domain vector and the action history of the second domain into the second domain vector using the converter generated by the converter generating unit 14.

Let us denote the set of first domain vectors $v_i{}^s$ by $V^{s,\ strain}$ and the set of second domain vectors $v_j{}^t$ by $V^{t,\ train}$, $$\mathcal{V}^{s,train}=\{v(u_i{}^s)|i\in \mathcal{P}^{train}\},\ \mathcal{V}^{t,train}:=\{v(u_j{}^t)|j\in \mathcal{P}^{train}\} \qquad [\text{Math. 6}]$$

Note that v( ) the conversion by the generated converter.

The similarity function generating unit 16 generates a function for deriving similarity between vectors (hereafter, similarity function). Specifically, the similarity function generating unit 16 generates the similarity function sim $(v_i{}^s, v_j{}^t)$ for deriving similarity between the first domain vector and the second domain vector.

The method by which the similarity function generating unit 16 generates the similarity function is arbitrary. For example, the correspondence f of action histories (data sets) between different domains of the same user can be considered as a regression. Therefore, the similarity function generating unit 16 may generate the function for deriving similarity between the first domain vector $f(v_i{}^s)$ converted based on this regression equation and the second domain vector $v_j{}^t$ (e.g. cosine similarity, Gaussian function, sign reversal of errors, etc.) as the similarity function.

The regression equation used here is also arbitrary. The similarity function generating unit 16 may use an arbitrarily defined rule-based mapping as the regression equation. The similarity function generating unit 16 may also simply consider the identity mapping as the regression equation and generate a function that derives the similarity (e.g., cosine similarity or Gaussian function) between the first domain vector itself and the second domain vector as the similarity function. The similarity function generating unit 16 may also generate the regression equation by performing supervised learning, such as linear regression, kernel regression, or neural networks.

Otherwise, the similarity function generating unit 16 may learn the similarity function that returns a greater similarity when the action history pairs are for the same user and a smaller similarity when the action history pairs are for different users. In this case, for example, as training data, data with a higher value set as the objective variable for pairs of action histories of the same user and data with a lower value set as the objective variable for pairs of action histories of different users can be used.

Otherwise, the similarity function generating unit 16 may learn a binary classification (f $((v_i{}^s, v_i{}^t))=1$, $f((v_i{}^s, v_j{}^t))=0$ (i and j are different)) that returns 1 when the action history of each domain in the combined data is the action history of the same user, and returns 0 when it is the action history of a different user. Then, the similarity function generating unit 16 may generate the similarity function in which a classification score of the binary classification (e.g., class affiliation probability) for the pair of the first domain vector and the second domain vector is used as the similarity.

The score function definition unit 17 uses the generated similarity function to define the score function score $(u_i{}^s, u_j{}^t)$ (i.e., a function that scores the proximity between a user with an action history in the first domain and a user with an action history in the second domain). Specifically, the score function definition unit 17 defines a score function as a function that uses the first domain vector converted from the user's action history in the first domain and the second domain vector converted from the user's action history in the second domain as arguments for the similarity function. In other words, $$\text{score}(u_i{}^s, u_j{}^t):=\text{sim}(v_i{}^s, v_j{}^t) \qquad [\text{Math. 7}]$$

The score function definition unit 17 may output the defined score function to the estimation device 20.

The action history input unit 12, the action history combining unit 13, the converter generating unit 14, the conversion unit 15, the similarity function generating unit 16, and the score function definition unit 17 are realized by a computer processor (e.g., CPU (Central Processing Unit), GPU (Graphics Processing Unit)) that operates according to a program (learning program).

For example, the program is stored in the storage unit 11 of the learning device 10, the processor reads the program, and may operate as the action history input unit 12, the action history combining unit 13, the converter generating unit 14, the conversion unit 15, the similarity function generating unit 16, and the score function definition unit 17 according to the program. The functions of the action history input unit 12, the action history combining unit 13, the converter generating unit 14, the conversion unit 15, the similarity function generating unit 16, and the score function definition unit 17 may be provided in a SaaS (Software as a Service) format.

The action history input unit 12, the action history combining unit 13, the converter generating unit 14, the conversion unit 15, the similarity function generating unit 16, and the score function definition unit 17 may each be realized in dedicated hardware. In addition, some or all of each component of each device may be realized by general-purpose or dedicated circuits (circuitry), processors, etc. or a combination of these. They may be configured by a single chip or by multiple chips connected via a bus. Part or all of each component of each device may be realized by a combination of the above-mentioned circuits, etc. and a program.

In the case where some or all of each component of the action history input unit 12, the action history combining unit 13, the converter generating unit 14, the conversion unit 15, the similarity function generating unit 16, and the score function definition unit 17 are realized by multiple information processing devices, circuits, etc., the multiple information processing devices, circuits, etc. may be arranged in a centralized or distributed arrangement. For example, the information processing devices and circuits, etc. may be realized as client-server systems, cloud computing systems, etc., each of which is connected via a communication network.

Returning to FIG. 1, the estimation device 20 includes a storage unit 21, a user set input unit 22, a score calculation unit 23, a matching unit 24, and an output unit 25.

The storage unit 21 stores various information used by the estimation device 20 for processing. Specifically, the storage unit 21 may store score functions generated by the score function definition unit 17. The storage unit 21 may also store the user's action history in the two domains as well as the storage unit 11. If the user's action history in the two domains is stored in a storage (not shown) connected via a communication line, the storage unit 21 may not store this action history. The storage unit 21 is realized by, for example, a magnetic disk.

The user set input unit 22 accepts input of the user's action history (i.e., users whose ID-synchronization is not known) in each domain not identified as being by a same user between the first domain and the second domain. In the following, among the set of users whose action history is not identified as being by the same user in each domain, the set of users in one domain is denoted as $P^{test}$ and the set of users in the other domain is denoted as $P^{candi}$.

It is arbitrary whether the set of users in either of the two domains is $P^{test}$ or $P^{candi}$. In the following, it is assumed that the set of users contained in $P^{test}$ is linked to each of the users contained in $P^{candi}$, respectively. Here, it is assumed that all of the users contained in $P^{test}$ are to be linked with each of the users contained in $P^{candi}$, $P^{candi} \supset P^{test}$. If only some of the users need to be linked, the inclusion of $P^{candi}$ and $P^{test}$ is arbitrary. Hereafter, users in the first domain are referred to as $P^{candi}$ and users in the second domain as $P^{test}$.

For example, in the example shown in FIG. 2, it is assumed that s101 to s102 and t101 to t102 are users whose ID-synchronization is not known, respectively. In this case, the user set input unit 22 accepts input of the action history of the first domain (the action history of users s101 to s102) for users whose ID-synchronization is not known, and the action history of the second domain (the action history of users t101 to t102).

In the following, the action history of an individual user in the first domain accepted by the user set input unit 22 is denoted by $u_i^s$, and the set of the action histories is denoted by $D^{s, test}$. Similarly, the action history of an individual user in the second domain accepted by the user set input unit 22 is denoted by $u_j^t$, and the set of the action histories is denoted by $D^{t, candi}$. In other words, $$D^{s, test} = \{ u_i^s \in D^s | i \in P^{test} \}, D^{t, candi} = \{ u_j^t \in D^t | j \in P^{candi} \} \quad \text{[Math. 8]}$$

The score calculation unit 23 calculates a score for an accepted pair of a user having the action history in the first domain and a user having the action history in the second domain, by using the score function defined by the score function definition unit 17. Specifically, the score calculation unit 23 calculates the set S of scores for all accepted pairs of users in the first domain and users in the second domain. In other words, $$S := \{ \text{score}(u_i^s, u_j^t) | u_j^t \in i \in P^{test}, j \in P^{candi} \}. \quad \text{[Math. 9]}$$

The matching unit 24 estimates the matching users in both domains based on the magnitude of the score calculated by the score calculation unit 23. Specifically, the matching unit 24 estimates a user identical to the user $P^{test}$ in the first domain from the user $P^{candi}$ in the second domain. The matching unit 24 may, for example, estimate a user in the second domain whose score in the score function calculated by pairing with a user in the first domain is greater as the same user in the first domain. Here, "greater" means "greatest" or "greatest among non-overlapping users".

The matching unit 24 may, for example, assume that the user p̂ (p superscript hat) with the highest score of users in other domains corresponding to the user p∈$P^{test}$ to be linked may be estimated to be the same user. In other words, the matching unit 24 may estimate that the user in the second domain with the highest score in the score function calculated by pairing with a user in the first domain is the same user in the first domain, based on Equation 1 illustrated below.

[Math. 10]

$$\hat{p} := \text{argmax} X_{j \in P^{candi}} \text{score}(u_p^s, u_j^t) \quad \text{(Equation 1)}$$

The matching unit 24 may also estimate the same users so that the users to be linked do not overlap. The matching unit 24 may, for example, estimate identical users in a manner similar to the stable matching problem. Specifically, the matching unit 24 sets the score calculated by setting the user of the first domain as $P^{test}$ and the user of the second domain as $P^{candi}$ as the first preference order, and vice versa, sets the score calculated by setting the user of the second domain as $P^{test}$ and the user of the first domain as $P^{candi}$ as the second preference order. Then, the matching unit 24 may use the first preference order and the second preference order to estimate the same user between domains so that users do not overlap between domains, by the Gale-Shapley algorithm described in Non Patent Literature 4.

The output unit 25 outputs the users who are estimated to be identical. The output unit 25 may output, for example, the users of the first domain and the users of the second domain, which are presumed to be the same, in association with each other.

The user set input unit 22, the score calculation unit 23, the matching unit 24, and the output unit 25 are realized by a computer processor that operates according to a program (estimation program).

Figure 3:
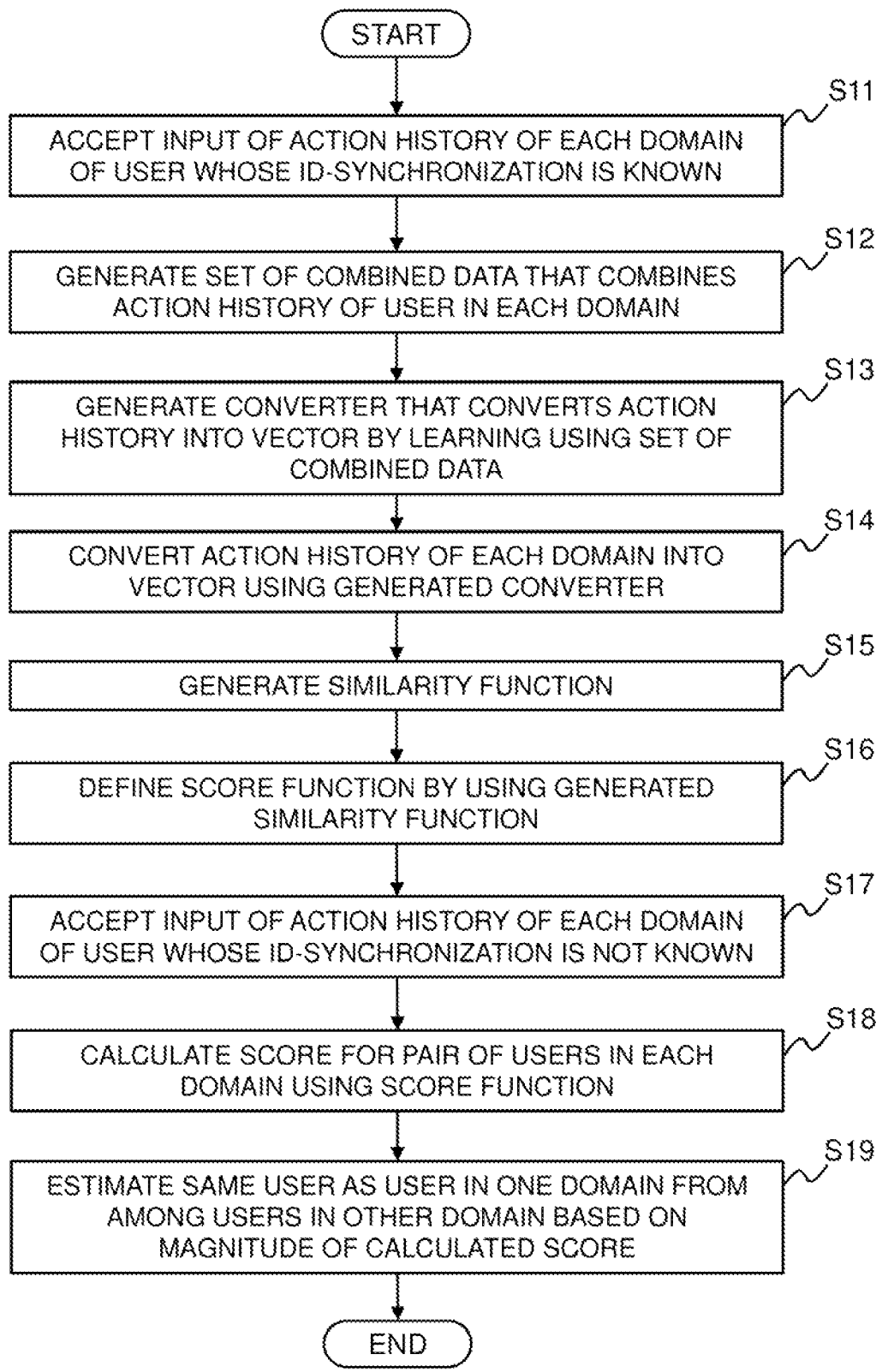
FIG. 3 It depicts a flowchart showing an example of the operation of the data linkage system.

Next, the operation of this exemplary embodiment of data linkage system will be described. FIG. 3 is a flowchart showing an example of the operation of the data linkage system 100 in this exemplary embodiment.

The action history input unit 12 accepts input of an action history of each domain of users whose ID-synchronization is known (step S11). The action history combining unit 13 generates a set of combined data that combines the action histories of users in each domain (step S12). The converter generating unit 14 generates a converter that converts an action history into a vector by learning using the set of combined data (step S13). The conversion unit 15 converts the action history of each domain into vectors using the generated converter (step S14). The similarity function generating unit 16 generates a similarity function (Step S15), and the score function definition unit 17 defines a score function by using the generated similarity function (Step S16).

The user set input unit 22 of the estimation device 20 accepts input of an action history of each domain of users whose ID-synchronization is not known (see Step S17). The score calculation unit 23 calculates scores for pairs of users in each domain using a score function (step S18). The matching unit 24 estimates a same user as the user in one domain from among the users in the other domain based on magnitude of the calculated score (Step S19).

Figure 4:
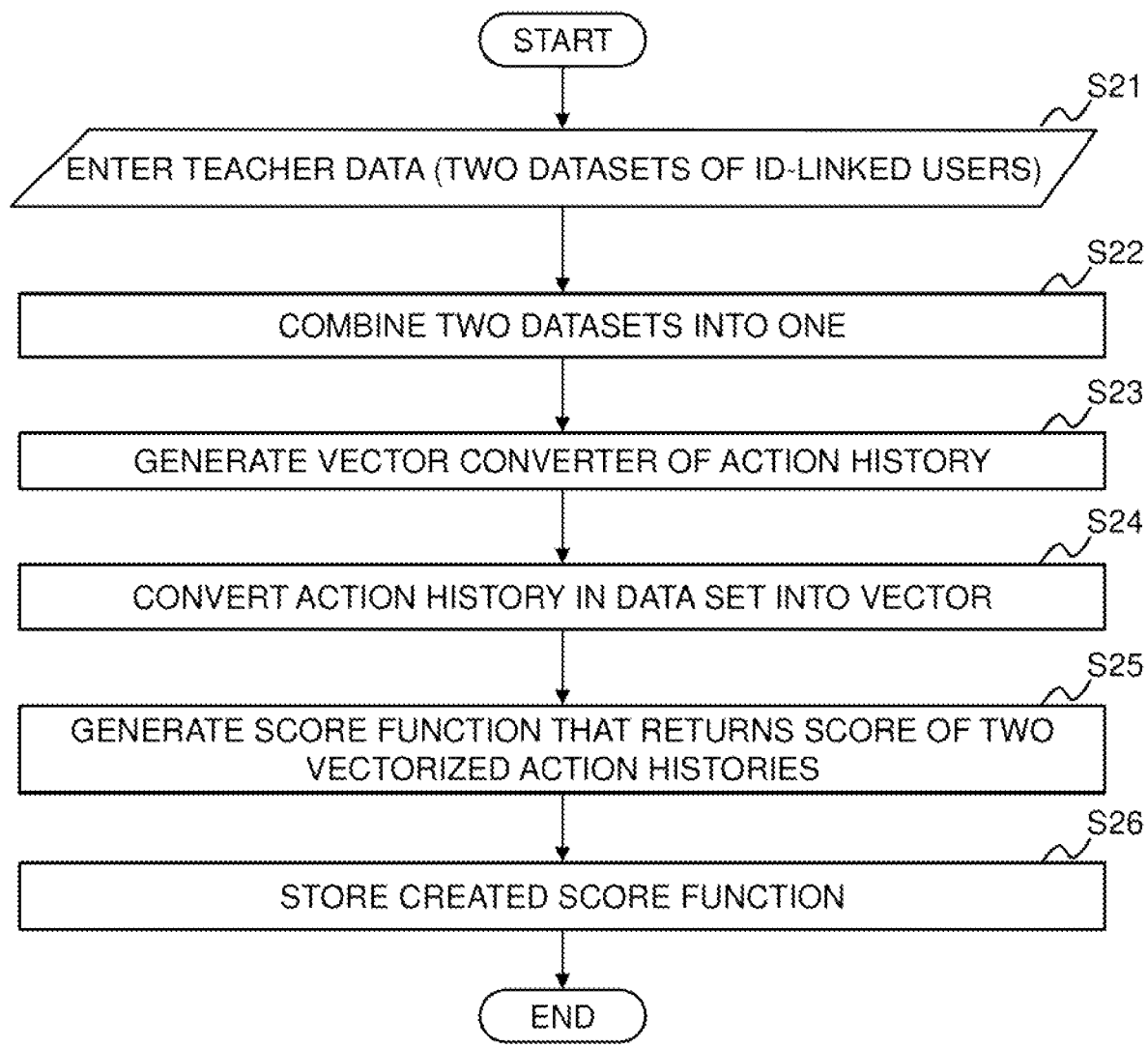
FIG. 4 It depicts a flowchart showing an example of the operation of the learning device.

FIG. 4 is a flowchart showing an example of the operation of the learning device 10. The action history input unit 12 inputs two ID-linked data sets (action history of each domain) as teacher data (step S21). The action history combining unit 13 combines the two datasets into one combined data (step S22). The converter generating unit 14 generates a vector converter of the action histories (Step S23). The conversion unit 15 converts the action history in the data set into a vector (Step S24). The similarity function generating unit 16 and the score function definition unit 17 generate a score function that returns the scores of the two vectorized action histories (step S25) and store the created score function in storage unit 11 (step S26).

Figure 5:
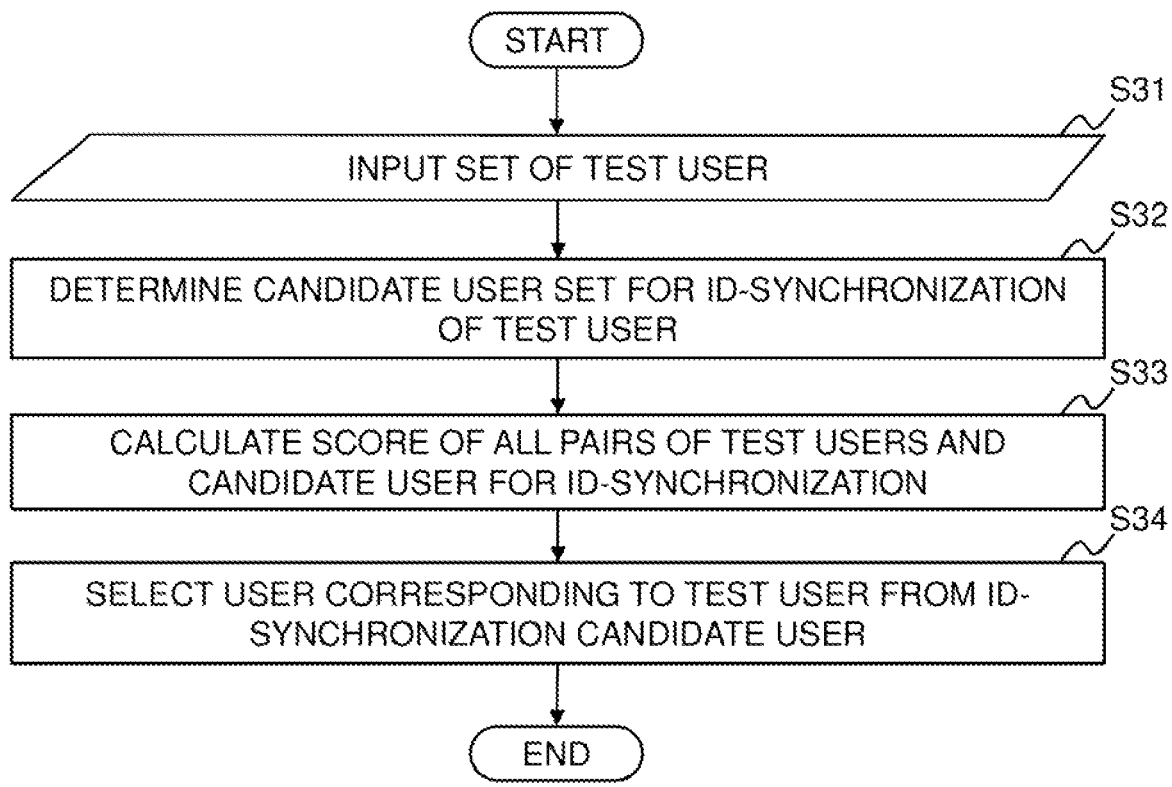
FIG. 5 It depicts a flowchart showing an example of the operation of the estimation device.

FIG. 5 is a flowchart showing an example of the operation of the estimation device 20. The user set input unit 22 inputs the set of test users $P^{test}$ (step S31). The user set input unit 22 also inputs the set of candidate users $P^{candi}$ subject to ID-synchronization with the test user to define the range (Step S32). The score calculation unit 23 calculates the scores of all pairs of test users and candidate users for ID-synchronization (Step S33). Then, the matching unit 24 estimates and selects the user corresponding to the test user from the ID-synchronization candidate users (Step S34).

As described above, in this exemplary embodiment, the action history input unit 12 of the learning device 10 accepts input of the action history of each domain of users whose ID-synchronization is known, the action history combining unit 13 generates a set of combined data that combines the user's action history in each domain. Then, the converter generating unit 14 generates a converter that converts an action history into a vector by learning using the set of combined data, and the conversion unit 15 converts the action history of each domain into vectors using the generated converter. The similarity function generating unit 16 then generates a similarity function, and the score function definition unit 17 defines a score function using the generated similarity function.

On the other hand, the user set input unit 22 of the estimation device 20 accepts input of the action history of each domain for users whose ID-synchronization is not known, and the score calculation unit 23 calculates a score for a pair of users in each domain using the score function. The matching unit 24 then estimates a same user as the user in one domain from among the users in the other domain based on magnitude of the calculated score. Thus, data between different domains associated with a user can be linked.

In addition, new value can be found by using data linked in this way. For example, insights that could not be obtained with only one data set can be obtained by looking over the two data sets. It is also possible to predict the behavior of a user in the other data set that appears only in one data set.

Next, a specific example of implementing offline measurement of the effectiveness of advertisements using the data linkage system 100 of this exemplary embodiment will be described, corresponding to the variables of the exemplary embodiment described above. Specifically, $D^s$ corresponds to the customer's advertisement browsing history data held by the advertising company, and $D^t$ corresponds to the customer's product purchase data held by the supermarket. In addition, $P^{train}$ is a set of ID-synchronized users, for example, corresponds to monitors who tell you what advertisement you saw and what product you bought.

Then, $p^{test}$ corresponds to the set of users who have viewed the advertisement, and $p^{candi}$ corresponds to the set of users who have purchased products at the supermarket. The range of $p^{candi}$ may be all users or only those who meet the given criteria. Also, for a user's action history $u=\{(a_1, t_1), \ldots, (a_n, t_n)\}$, and $u \in D^s$, then $a_i$ is an advertisement made, and for $u \in D^t$, $a_i$ is a product that was purchased.

The action history combining unit 13 creates a set of combined data that combines the action histories of the monitor. The combined data u is, for example, u={(advertisement a1, R2/3/5), (product x3, R2/4/13), (advertisement c3, R1/8/1), ...} $\in D^{fusion,\ train}$. Next, the converter generating unit 14 sorts the action history in time order, considers items as words, and learns Doc2Vec based on $D^{fusion,\ train}$. The learned vector conversion is denoted by v.

The conversion unit 15 converts each of the two (domain) action histories of the monitor into a vector. The similarity function generating unit 16 learns the regression f, for example, with a neural network. The score function definition unit 17 defines the score function as follows. The similarity function sim is, for example, the cosine similarity.

$$\text{score}(\mathcal{U}^s, \mathcal{U}^t) := \text{sim}(f(v(\mathcal{U}^s)), v(\mathcal{U}^t)) \qquad \text{[Math. 11]}$$

The score calculation unit 23 uses the score function to calculate the score of the pair of the user of the advertisement ($P^{test}$) and the user of the supermarket ($P^{candi}$). The matching unit 24 estimates a user pair for the test user based on the Gale-Shapley algorithm by using the calculated score. The output unit 25 outputs the set of estimated user pairs $$\{(u_i^s, \hat{u}_i^t) | i \in \mathcal{P}^{test}\}. \qquad \text{[Math. 12]}$$

Thus, the data linkage system of this exemplary embodiment can be applied to measuring the effectiveness of advertisements. In addition, the data linkage system of this exemplary embodiment can be used for causal analysis and recommendation. For example, it can be applied to causal analysis of the degree of influence of advertisements and product recommendations in online stores.

Figure 6:
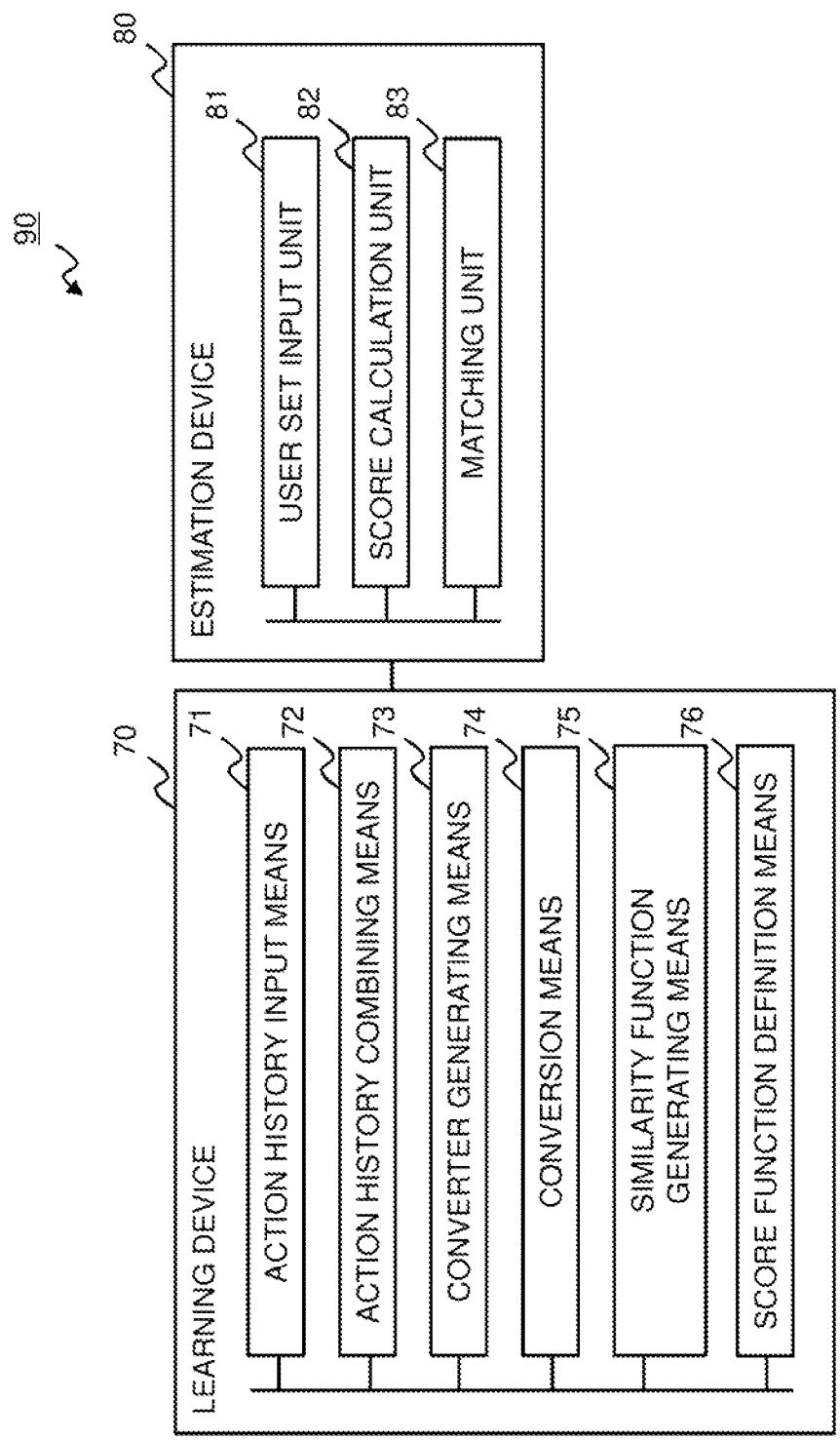
FIG. 6 It depicts a block diagram showing an overview of a data linkage system according to the present invention.

The following is an overview of the invention. FIG. 6 is a block diagram showing an overview of a data linkage system according to the present invention. The data linkage system 90 (e.g., data linkage system 100) according to the present invention includes a learning device 70 (e.g., learning device 10) which generates a score function (e.g., score $(u_i^s, u_j^t)$), which is a function that scores proximity between a user with an action history in a first domain and a user with an action history in a second domain, and an estimation device 80 (e.g., estimation device 80) which estimates a user matched in the first domain and the second domain.

The learning device 70 includes an action history input means 71 (e.g., action history input unit 12) which accepts input of the action history (e.g., $D^{s,\ train}$) of the first domain in the user (e.g., $p^{train}$) identified as being by a same user (e.g., user linkage is known) between the first domain and the second domain, and input of the action history (e.g., $D^{t,\ train}$) of the second domain, an action history combining means 72 (e.g., action history combining unit 13) which generates a set of combined data (e.g., $D^{fusion,\ train}$) that combines the user's action history in the first domain with the user's action history in the second domain, a converter generating means 73 (e.g., converter generating unit 14) which generates a converter that converts an action history into a vector by learning using the set of combined data, a conversion means 74 (e.g., conversion unit 15) which converts the action history of the first domain into a first domain vector (e.g., $V^{s,\ train}$) and the action history of the second domain into a second domain vector (e.g., $V^{t,\ train}$) using the generated converter, a similarity function generating means 75 (e.g., similarity function generating unit 16) which generates a similarity function (e.g., $sim(v_i^s, v_j^t)$) for deriving similarity between the first domain vector and the second domain vector, and a score function definition means 76 (e.g., score function definition unit 17) which defines the score function using the generated similarity function.

The estimation device 80 includes a user set input means 81 (e.g., user set input unit 22) which accepts input of the user's action history in the first domain (e.g., $P^{test}$) not identified as being by a same user between the first domain and the second domain, and input of the user's action history of the second domain (e.g., $p^{candi}$) a score calculation means 82 (e.g., score calculation unit 23) which calculates a score (e.g., S) for an accepted pair of a user having the action history in the first domain and a user having the action history in the second domain, by using the score function, and a matching means 83 (e.g., matching unit 24) which estimates a same user as the user in the first domain from among the users in the second domain based on magnitude of the calculated score.

Such a configuration allows data between different domains associated with a user to be linked.

The similarity function generating means 75 may generate a function to derive the similarity between the first domain vector transformed based on a regression equation representing correspondence of action history between different domains of the same user and the second domain vector, as the similarity function.

Otherwise, the similarity function generating means 75 may learn a binary classification that returns 1 when the action history of each domain in the combined data is the action history of the same user and returns 0 when it is the action history of a different user, and generate the similarity function in which a classification score of the binary classification for the pair of the first domain vector and the second domain vector is used as the similarity.

The score function definition means 76 may define a score function as a function that uses the first domain vector converted from the user's action history in the first domain and the second domain vector converted from the user's action history in the second domain as arguments for the similarity function.

The matching means 83 may estimate the user of the second domain whose score of the score function calculated by pairing with the user of the first domain is larger as the same user of the first domain.

The converter generating means 83 may generate the converter that converts the action history into a text by considering an action result indicated by the action history as words, and that converts the textualized action history into a numerical vector.

Figure 7:
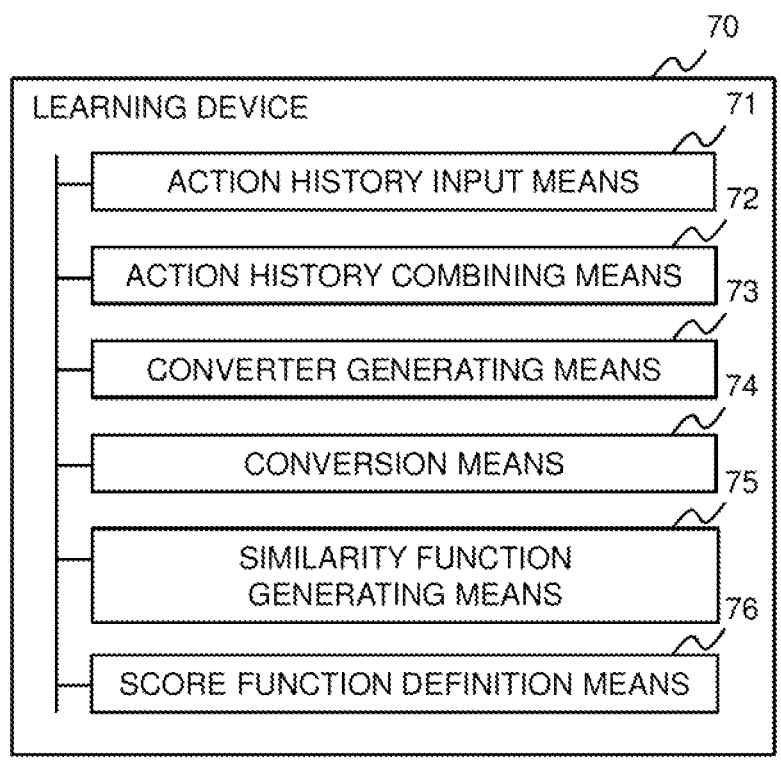
FIG. 7 It depicts a block diagram showing an overview of a learning device according to the present invention.

FIG. 7 is a block diagram showing an overview of a learning device according to the present invention. The learning device 70 according to the present invention includes the action history input means 71, the action history combining means 72, the converter generating means 73, the conversion means 74, the similarity function generating means 75, and the score function definition means 76. The contents of each configuration provided by the learning device 70 are the same as those provided by the learning device 70 illustrated in FIG. 6.

Figure 8:
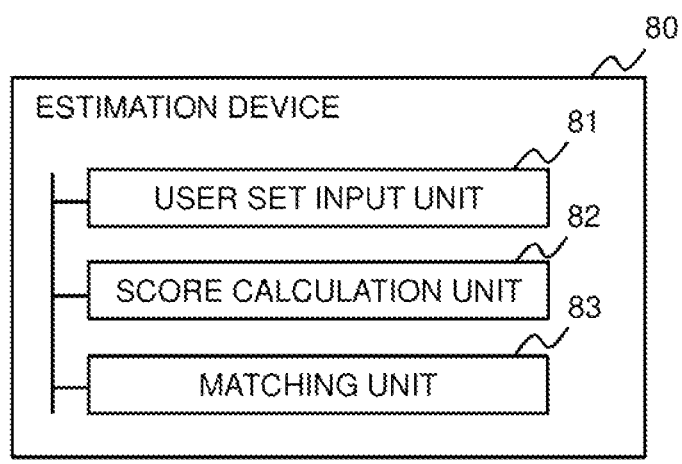
FIG. 8 It depicts a block diagram showing an overview of an estimation device according to the present invention.

FIG. 8 is a block diagram showing an overview of an estimation device according to the present invention. The estimation device 80 according to the present invention includes the user set input means 81, the score calculation means 82, and the matching means 83. The contents of each configuration provided by the estimation device 80 are the same as those provided by the estimation device 80 illustrated in FIG. 6.

Figure 9:
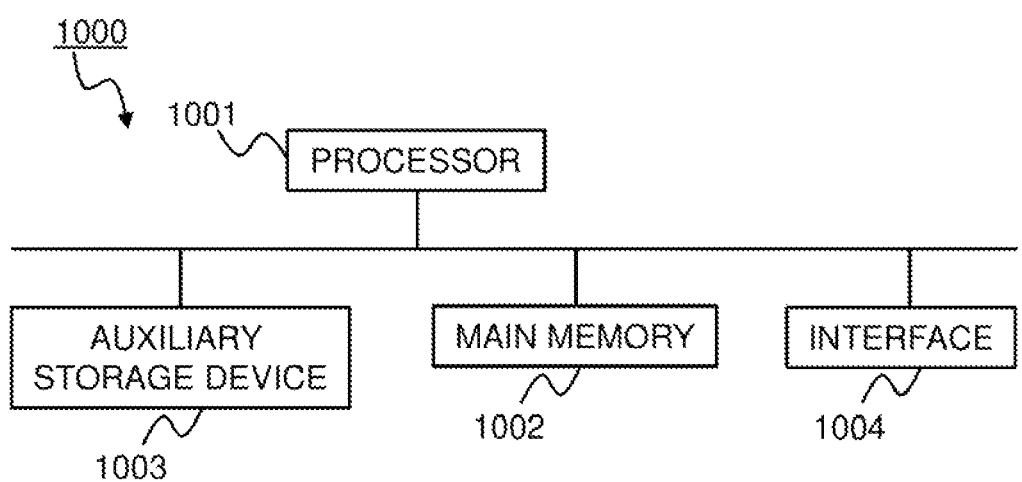
FIG. 9 It depicts a schematic block diagram showing the configuration of a computer for at least one exemplary embodiment.

FIG. 9 is a schematic block diagram showing the configuration of a computer for at least one exemplary embodiment. The computer 1000 has a processor 1001, a main storage device 1002, an auxiliary storage device 1003, and an interface 1004.

The above-mentioned learning device 70 and estimation device 80 are each implemented in a computer 1000. The operations of each of the above-mentioned processing units are stored in the auxiliary storage device 1003 in the form of a programs (learning program and estimation program). The processor 1001 reads the programs from the auxiliary storage device 1003, expands the read programs into the main storage device 1002 and executes the above processing according to said programs.

In at least one exemplary embodiment, the auxiliary storage device 1003 is an example of a non-temporary tangible medium. Other examples of non-temporary tangible medium include magnetic disks connected via the interface 1004, magneto-optical disks, CD-ROM (Compact Disc Read-only memory), DVD-ROM (Read-only memory), semiconductor memory, etc. When the program is delivered to a computer 1000 through a communication line, the computer 1000 which is received delivery, may expand the program into the main storage device 1002 and execute the above process.

The said program may also be used to realize some of the aforementioned functions. Furthermore, said program may be a so-called difference file (difference program), which realizes the aforementioned functions in combination with other programs already stored in the auxiliary storage device 1003.

Some or all of the aforementioned exemplary embodiment can be described as supplementary notes mentioned below, but are not limited to the following supplementary notes.

(Supplementary note 1) A data linkage system comprising: a learning device which generates a score function, which is a function that scores proximity between a user with an action history in a first domain and a user with an action history in a second domain; and an estimation device which estimates a user matched in the first domain and the second domain, wherein the learning device includes: an action history input means which accepts input of the action history of the first domain in the user identified as being by a same user between the first domain and the second domain, and input of the action history of the second domain; an action history combining means which generates a set of combined data that combines the user's action history in the first domain with the user's action history in the second domain; a converter generating means which generates a converter that converts an action history into a vector by learning using the set of combined data; a conversion means which converts the action history of the first domain into a first domain vector and the action history of the second domain into a second domain vector using the generated converter; a similarity function generating means which generates a similarity function for deriving similarity between the first domain vector and the second domain vector; and a score function definition means which defines the score function using the generated similarity function, and wherein the estimation device includes: a user set input means which accepts input of the user's action history in the first domain not identified as being by a same user between the first domain and the second domain, and input of the user's action history of the second domain; a score calculation means which calculates a score for an accepted pair of a user having the action history in the first domain and a user having the action history in the second domain, by using the score function; and a matching means which estimates a same user as the user in the first domain from among the users in the second domain based on magnitude of the calculated score.

(Supplementary note 2) The data linkage system according to Supplementary note 1, wherein the similarity function generating means generates a function to derive the similarity between the first domain vector transformed based on a regression equation representing correspondence of action history between different domains of the same user and the second domain vector, as the similarity function.

(Supplementary note 3) The data linkage system according to Supplementary note 1, wherein the similarity function generating means learns a binary classification that returns 1 when the action history of each domain in the combined data is the action history of the same user and returns 0 when it is the action history of a different user, and generates the similarity function in which a classification score of the binary classification for the pair of the first domain vector and the second domain vector is used as the similarity.

(Supplementary note 4) The data linkage system according to any one of Supplementary notes 1 to 3, wherein the score function definition means defines a score function as a function that uses the first domain vector converted from the user's action history in the first domain and the second domain vector converted from the user's action history in the second domain as arguments for the similarity function.

(Supplementary note 5) The data linkage system according to any one of Supplementary notes 1 to 4, wherein the matching means estimates the user of the second domain whose score of the score function calculated by pairing with the user of the first domain is larger as the same user of the first domain.

(Supplementary note 6) The data linkage system according to any one of Supplementary notes 1 to 5, wherein the converter generating means generates the converter that converts the action history into a text by considering an action result indicated by the action history as words, and that converts the textualized action history into a numerical vector.

(Supplementary note 7) A learning device comprising: an action history input means which accepts input of an action history of a first domain in a user identified as being by a same user between the first domain and a second domain, and input of an action history of the second domain; an action history combining means which generates a set of combined data that combines the user's action history in the first domain with the user's action history in the second domain; a converter generating means which generates a converter that converts an action history into a vector by learning using the set of combined data; a conversion means which converts the action history of the first domain into a first domain vector and the action history of the second domain into a second domain vector using the generated converter; a similarity function generating means which generates a similarity function for deriving similarity between the first domain vector and the second domain vector; and a score function definition means which defines a score function, which is a function that scores proximity between a user with an action history in the first domain and a user with an action history in the second domain, by using the generated similarity function.

(Supplementary note 8) An estimation device comprising: a user set input means which accepts input of a user's action history in a first domain not identified as being by a same user between the first domain and a second domain, and input of a user's action history of the second domain; a score calculation means which calculates a score for an accepted pair of a user having the action history in the first domain and a user having the action history in the second domain, by using a score function which is a function that scores proximity between a user with an action history in the first domain and a user with an action history in the second domain; and a matching means which estimates a same user as the user in the first domain from among the users in the second domain based on magnitude of the calculated score, wherein, the score function is generated by a learning device, and the learning device comprising: an action history input means which accepts input of the action history of the first domain in the user identified as being by the same user between the first domain and the second domain, and input of the action history of the second domain; an action history combining means which generates a set of combined data that combines the user's action history in the first domain with the user's action history in the second domain; a converter generating means which generates a converter that converts an action history into a vector by learning using the set of combined data; a conversion means which converts the action history of the first domain into a first domain vector and the action history of the second domain into a second domain vector using the generated converter; a similarity function generating means which generates a similarity function for deriving similarity between the first domain vector and the second domain vector; and a score function definition means which defines the score function using the generated similarity function.

(Supplementary note 9) A data linkage method comprising: accepting input of an action history of a first domain in a user identified as being by a same user between the first domain and a second domain, and input of an action history of the second domain; generating a set of combined data that combines the user's action history in the first domain with the user's action history in the second domain; generating a converter that converts an action history into a vector by learning using the set of combined data; converting the action history of the first domain into a first domain vector and the action history of the second domain into a second domain vector using the generated converter; generating a similarity function for deriving similarity between the first domain vector and the second domain vector; defining a score function, which is a function that scores the proximity between a user with an action history in the first domain and a user with an action history in the second domain, by using the generated similarity function; accepting input of the user's action history in the first domain not identified as being by the same user between the first domain and the second domain, and input of the user's action history of the second domain; calculating a score for an accepted pair of a user having the action history in the first domain and a user having the action history in the second domain, by using the score function; and estimating a same user as the user in the first domain from among the users in the second domain based on magnitude of the calculated score.

(Supplementary note 10) A score function generating method comprising: accepting input of an action history of a first domain in a user identified as being by a same user between the first domain and a second domain, and input of an action history of the second domain; generating a set of combined data that combines the user's action history in the first domain with the user's action history in the second domain; generating a converter that converts an action history into a vector by learning using the set of combined data; converting the action history of the first domain into a first domain vector and the action history of the second domain into a second domain vector using the generated converter; generating a similarity function for deriving similarity between the first domain vector and the second domain vector; and defining a score function, which is a function that scores the proximity between a user with an action history in the first domain and a user with an action history in the second domain, by using the generated similarity function.

(Supplementary note 11) An estimation method comprising: accepting input of a user's action history in a first domain not identified as being by a same user between the first domain and a second domain, and input of a user's action history of the second domain; calculating a score for an accepted pair of a user having the action history in the first domain and a user having the action history in the second domain, by using a score function which is a function that scores the proximity between a user with an action history in a first domain and a user with an action history in a second domain; and estimating a same user as the user in the first domain from among the users in the second domain based on magnitude of the calculated score, wherein, the score function is generated by a learning device, and the learning device comprising: an action history input means which accepts input of the action history of the first domain in the user identified as being by the same user between the first domain and the second domain, and input of the action history of the second domain; an action history combining means which generates a set of combined data that combines the user's action history in the first domain with the user's action history in the second domain; a converter generating means which generates a converter that converts an action history into a vector by learning using the set of combined data; a conversion means which converts the action history of the first domain into a first domain vector and the action history of the second domain into a second domain vector using the generated converter; a similarity function generating means which generates a similarity function for deriving similarity between the first domain vector and the second domain vector; and a score function definition means which defines the score function using the generated similarity function.

(Supplementary note 12) A program recording medium in which a learning program is recorded, the learning program causing a computer to execute: action history input process of accepting input of an action history of a first domain in a user identified as being by a same user between the first domain and a second domain, and input of an action history of the second domain; action history combining process of generating a set of combined data that combines the user's action history in the first domain with the user's action history in the second domain; a converter generating process of generating a converter that converts an action history into a vector by learning using the set of combined data; a conversion process of converting the action history of the first domain into a first domain vector and the action history of the second domain into a second domain vector using the generated converter; a similarity function generating process of generating a similarity function for deriving similarity between the first domain vector and the second domain vector; and a score function definition process of defining a score function, which is a function that scores the proximity between a user with an action history in the first domain and a user with an action history in the second domain, by using the generated similarity function.

(Supplementary note 13) A program recording medium in which an estimation program is recorded, the estimation program causing a first computer to execute: user set input process of accepting input of a user's action history in a first domain not identified as being by a same user between the first domain and a second domain, and input of a user's action history of the second domain; score calculation process of calculating a score for an accepted pair of a user having the action history in the first domain and a user having the action history in the second domain, by using a score function which is a function that scores the proximity between a user with an action history in a first domain and a user with an action history in a second domain; and a matching process of estimating a same user as the user in the first domain from among the users in the second domain based on magnitude of the calculated score, wherein, the score function is generated by a second computer, and the second computer comprising: an action history input means which accepts input of the action history of the first domain in the user identified as being by the same user between the first domain and the second domain, and input of the action history of the second domain; an action history combining means which generates a set of combined data that combines the user's action history in the first domain with the user's action history in the second domain; a converter generating means which generates a converter that converts an action history into a vector by learning using the set of combined data; a conversion means which converts the action history of the first domain into a first domain vector and the action history of the second domain into a second domain vector using the generated converter; a similarity function generating means which generates a similarity function for deriving similarity between the first domain vector and the second domain vector; and a score function definition means which defines the score function using the generated similarity function.

(Supplementary note 14) A learning program causing a computer to execute: action history input process of accepting input of an action history of a first domain in a user identified as being by a same user between the first domain and a second domain, and input of an action history of the second domain; action history combining process of generating a set of combined data that combines the user's action history in the first domain with the user's action history in the second domain; a converter generating process of generating a converter that converts an action history into a vector by learning using the set of combined data; a conversion process of converting the action history of the first domain into a first domain vector and the action history of the second domain into a second domain vector using the generated converter; a similarity function generating process of generating a similarity function for deriving similarity between the first domain vector and the second domain vector; and a score function definition process of defining a score function, which is a function that scores the proximity between a user with an action history in the first domain and a user with an action history in the second domain, by using the generated similarity function.

(Supplementary note 15) An estimation program causing a first computer to execute: user set input process of accepting input of a user's action history in a first domain not identified as being by a same user between the first domain and a second domain, and input of a user's action history of the second domain; score calculation process of calculating a score for an accepted pair of a user having the action history in the first domain and a user having the action history in the second domain, by using a score function which is a function that scores the proximity between a user with an action history in a first domain and a user with an action history in a second domain; and a matching process of estimating a same user as the user in the first domain from among the users in the second domain based on magnitude of the calculated score, wherein, the score function is generated by a second computer, and the second computer comprising: an action history input means which accepts input of the action history of the first domain in the user identified as being by the same user between the first domain and the second domain, and input of the action history of the second domain; an action history combining means which generates a set of combined data that combines the user's action history in the first domain with the user's action history in the second domain; a converter generating means which generates a converter that converts an action history into a vector by learning using the set of combined data; a conversion means which converts the action history of the first domain into a first domain vector and the action history of the second domain into a second domain vector using the generated converter; a similarity function generating means which generates a similarity function for deriving similarity between the first domain vector and the second domain vector; and a score function definition means which defines the score function using the generated similarity function.

While the present invention has been explained with reference to the exemplary embodiments, the present invention is not limited to the aforementioned exemplary embodiments. Various changes understandable to those skilled in the art within the scope of the present invention can be made to the structures and details of the present invention.

REFERENCE SIGNS LIST

10 Learning device
11 Storage unit
12 Action history input unit
13 Action history combining unit
14 Converter generating unit
15 Conversion unit
16 Similarity function generating unit
17 Score function definition unit
20 Estimation device
21 Storage unit
22 User set input unit
23 Score calculation unit
24 Matching unit
25 Output unit
100 Data linkage system

The invention claimed is:

1. A data linkage system comprising:
a learning device configured to generate a score function, the score function scoring proximity between a user with an action history in a first domain and a user with an action history in a second domain; and
an estimation device configured to estimate users matched in the first domain and the second domain,
wherein the learning device includes:
a first memory storing instructions; and
one or more first processors configured to execute the instructions to:
accept input of the action history of said users in the first domain and in the second domain;
generate a set of combined data combining the accepted action history;
generate a converter configured to convert an action history into a vector by learning using the set of combined data;
convert the action history of the first domain into a first domain vector and the action history of the second domain into a second domain vector using the generated converter;
generate a similarity function for deriving similarity between the first domain vector and the second domain vector; and
define the score function using the generated similarity function, and
wherein the estimation device includes:
a second memory storing instructions; and
one or more second processors configured to execute the instructions to:
accept input of the action history of users in the first domain and in the second domain, said users not identified as same user;
calculate a score for an accepted pair of a user having the action history in the first domain and a user having the action history in the second domain, by using the score function; and
estimate users matched in the first domain and the second domain based on magnitude of the calculated score.

2. The data linkage system according to claim 1, wherein the first processor is configured to execute the instructions to
generate a function to derive the similarity between the first domain vector transformed based on a regression equation representing correspondence of action history between different domains of the same user and the second domain vector, as the similarity function.

3. The data linkage system according to claim 1, wherein the first processor is configured to execute the instructions to
learn a binary classification that returns 1 when the action history of each domain in the combined data is the action history of the same user and returns 0 when it is the action history of a different user, and generate the similarity function in which a classification score of the binary classification for the pair of the first domain vector and the second domain vector is used as the similarity.

4. The data linkage system according to claim 1, wherein the first processor is configured to execute the instructions to
define a score function as a function that uses the first domain vector converted from the user's action history in the first domain and the second domain vector converted from the user's action history in the second domain as arguments for the similarity function.

5. The data linkage system according to claim 1, wherein the second processor is configured to execute the instructions to estimate the user of the second domain whose score of the score function calculated by pairing with the user of the first domain is larger as the same user of the first domain.

6. The data linkage system according to claim 1, wherein the first processor is configured to execute the instructions to generate the converter that converts the action history into a text by considering an action result indicated by the action history as words, and that converts the textualized action history into a numerical vector.

7. A learning device comprising:

a memory storing instructions; and one or more processors configured to execute the instructions to:

accept input of an action history of users matched in a first domain and a second domain;

generate a set of combined data that combines the accepted action history;

generate a converter that converts an action history into a vector by learning using the set of combined data;

convert the action history of the first domain into a first domain vector and the action history of the second domain into a second domain vector using the generated converter;

generate a similarity function for deriving similarity between the first domain vector and the second domain vector; and define a score function, the score function scoring proximity between a user with an action history in the first domain and a user with an action history in the second domain, by using the generated similarity function.

8. An estimation device comprising:

a first memory storing instructions; and one or more first processors configured to execute the instructions to:

accept input of an action history of users in a first domain and in a second domain, said users not identified as a same user;

calculate a score for an accepted pair of a user having the action history in the first domain and a user having the action history in the second domain, by using a score function scoring proximity between a user with an action history in the first domain and a user with an action history in the second domain; and estimate users matched in the first domain and the second domain based on magnitude of the calculated score, wherein, the score function is generated by a learning device, and the learning device comprising:

a second memory storing instructions; and one or more second processors configured to execute the instructions to:

accept input of the action history of users matched in the first domain and the second domain;

generate a set of combined data that combines the accepted action history;

generate a converter that converts an action history into a vector by learning using the set of combined data;

convert the action history of the first domain into a first domain vector and the action history of the second domain into a second domain vector using the generated converter;

generate a similarity function for deriving similarity between the first domain vector and the second domain vector; and define the score function using the generated similarity function.

* * * * *